(12) United States Patent
Chen et al.

(10) Patent No.: US 9,910,652 B2
(45) Date of Patent: *Mar. 6, 2018

(54) DEPLOYING APPLICATIONS

(71) Applicant: International Business Machines Corporation, Armonk, NY (US)

(72) Inventors: Xiao Bin Chen, Beijing (CN); Zhang Hong Chen, Ningbo (CN); Yan Feng, Beijing (CN); Guo Q. Li, Beijing (CN); Xiao Lin Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/953,898

(22) Filed: Nov. 30, 2015

(65) Prior Publication Data

US 2017/0153880 A1 Jun. 1, 2017

(51) Int. Cl.
*G06F 9/445* (2006.01)

(52) U.S. Cl.
CPC .......... *G06F 8/60* (2013.01); *G06F 8/61* (2013.01); *G06F 8/65* (2013.01); *G06F 9/44505* (2013.01)

(58) Field of Classification Search
CPC ..... G06F 8/60; G06F 8/61; G06F 8/65; G06F 9/44505
See application file for complete search history.

(56) References Cited

U.S. PATENT DOCUMENTS

| | | | |
|---|---|---|---|
| 9,027,016 B1 | 5/2015 | Alford et al. | |
| 9,043,786 B1* | 5/2015 | Hodge | G06F 9/45558 717/171 |
| 9,172,657 B2* | 10/2015 | Catrein | G06F 9/5072 |
| 9,244,669 B2* | 1/2016 | Govindaraju | G06F 8/61 |
| 9,268,592 B2* | 2/2016 | Hassine | G06F 9/45558 |
| 9,477,455 B2* | 10/2016 | Avisror | G06F 8/61 |
| 2007/0250574 A1* | 10/2007 | Tseitlin | G06Q 10/06 709/205 |
| 2011/0145790 A1* | 6/2011 | Rajaraman | G06F 11/3668 717/124 |
| 2011/0283194 A1* | 11/2011 | Chen | G06F 8/61 715/735 |

(Continued)

OTHER PUBLICATIONS

Fischer et al., "Engage—A Deployment Management System", ACM, PLDI'12, Jun. 2012, pp. 263-273; <http://dl.acm.org/citation.cfm?id=2254096&CFID=776096390&CFTOKEN=29447332>.*

(Continued)

*Primary Examiner* — Thuy Dao
*Assistant Examiner* — Ben C Wang
(74) *Attorney, Agent, or Firm* — James H. Mayfield

(57) ABSTRACT

A method, executed by a computer, for deploying an application includes receiving a deployment description that indicates the one or more deployment configurations and an artifact corresponding to a deployment, accessing a repository that contains the deployment configurations and the artifact that correspond to the deployment, enabling a user to select a subset of deployment configurations, and deploying the subset of deployment configurations and artifact to a processing environment. A computer program product and computer system corresponding to the above method are also disclosed herein.

12 Claims, 5 Drawing Sheets

(56) References Cited

U.S. PATENT DOCUMENTS

| | | | |
|---|---|---|---|
| 2012/0066674 A1* | 3/2012 | Xie | G06F 8/60 717/174 |
| 2012/0110588 A1* | 5/2012 | Bieswanger | G06F 8/65 718/104 |
| 2012/0331519 A1 | 12/2012 | Yu et al. | |
| 2013/0031542 A1 | 1/2013 | Arcilla et al. | |
| 2013/0117424 A1 | 5/2013 | Colyer et al. | |
| 2013/0238805 A1* | 9/2013 | Catrein | H04L 47/70 709/226 |
| 2013/0305244 A1* | 11/2013 | Pohlmann | G06F 9/455 718/1 |
| 2013/0346945 A1* | 12/2013 | Yousouf | G06F 8/36 717/121 |
| 2014/0096128 A1* | 4/2014 | Pohlmann | G06F 8/61 717/176 |
| 2014/0279201 A1* | 9/2014 | Iyoob | G06Q 30/0631 705/26.7 |
| 2014/0310703 A1 | 10/2014 | de Souza et al. | |
| 2014/0337830 A1* | 11/2014 | Schwaninger | G06F 8/61 717/177 |
| 2014/0380308 A1* | 12/2014 | Hassine | G06F 9/45558 718/1 |
| 2015/0074278 A1* | 3/2015 | Maes | H04L 47/70 709/226 |
| 2015/0121483 A1* | 4/2015 | Perez | H04L 41/5041 726/5 |
| 2015/0163288 A1* | 6/2015 | Maes | H04L 67/10 709/203 |
| 2015/0244596 A1 | 8/2015 | Abuelsaad et al. | |
| 2015/0341240 A1* | 11/2015 | Iyoob | H04L 43/08 709/201 |
| 2015/0372883 A1* | 12/2015 | Lam | H04L 41/0893 709/226 |
| 2015/0378702 A1* | 12/2015 | Govindaraju | G06F 8/61 717/177 |
| 2016/0065417 A1* | 3/2016 | Sapuram | G06Q 30/0631 709/223 |
| 2016/0080479 A1* | 3/2016 | Zhang | H04L 67/10 709/217 |
| 2016/0105493 A1* | 4/2016 | Bacher | H04L 67/10 709/217 |
| 2016/0139902 A1* | 5/2016 | Dimitrakos | G06F 11/30 717/120 |
| 2016/0147522 A1* | 5/2016 | Dimitrakos | G06F 8/61 717/174 |
| 2016/0179494 A1* | 6/2016 | Pavlov | G06F 8/61 717/177 |
| 2016/0239281 A1* | 8/2016 | Avisror | G06F 8/61 |
| 2016/0255095 A1* | 9/2016 | Maes | G06F 17/30194 726/1 |
| 2016/0259658 A1* | 9/2016 | Gocek | G06F 9/45558 |
| 2016/0274885 A1* | 9/2016 | Srinivasan | G06F 8/65 |
| 2016/0274906 A1* | 9/2016 | Srinivasan | G06F 8/60 |
| 2016/0283522 A1* | 9/2016 | Grueneberg | G06F 11/36 |
| 2016/0344798 A1* | 11/2016 | Kapila | H04L 67/34 |
| 2017/0060557 A1* | 3/2017 | Bendelac | G06F 8/60 |
| 2017/0060615 A1* | 3/2017 | Thakkar | G06F 9/45558 |
| 2017/0060628 A1* | 3/2017 | Tarasuk-Levin | G06F 9/4856 |
| 2017/0123777 A1* | 5/2017 | Mittal | G06F 8/60 |
| 2017/0153880 A1* | 6/2017 | Chen | G06F 8/60 |
| 2017/0177324 A1* | 6/2017 | Frank | H04L 67/34 |
| 2017/0180487 A1* | 6/2017 | Frank | H04L 67/16 |
| 2017/0255460 A1* | 9/2017 | Frank | H04L 41/0813 |
| 2017/0262266 A1* | 9/2017 | Bendelac | G06F 8/60 |

OTHER PUBLICATIONS

Lan et al., "A Model-Based Autonomous Engine for Application Runtime Environment Configuration and Deployment in PaaS Cloud", IEEE, Feb. 2015, pp. 823-828; <http://ieeexplore.ieee.org/stamp/stamp.jsp?tp=&arnumber=7037768>.*

Wettinger et al., "Integrating Configuration Management with Model-Driven Cloud Management Based on TOSCA", 2013 SciTePress, CLOSER 2012, May 2013, pp. 1-11; <https://pdfs.semanticscholar.org/699f/1302ffb846a70bdd5cca9ecb17183f09a6f7.pdf>.*

T. Binz et al., Advanced Web Services, Chap. 22, "TOSCA—Portable Automated Deployment and Management of Cloud Applications", Springer, Dec. 2012, pp. 527-549; <https://link.springer.com/content/pdf/10.1007%2F978-1-4614-7535-4.pdf>.*

Di Cosmo et al., "Automated Synthesis and Deployment of Cloud Applications", ACM, Sep. 2014, pp. 211-221; <https://dl.acm.org/citation.cfm?id=2642980&CFID=993336535&CFTOKEN=51222302>.*

Singh et al., "Automated provisioning of application in IAAS cloud using Ansible configuration management", IEEE, Jan. 2016, pp. 81-85; <http://ieeexplore.ieee.org/document/7375087/>.*

Chen et al., "Deploying Applications", U.S. Appl. No. 15/157,427, filed May 18, 2016, 24 pages.

IBM Appendix P, list of patents and patent applications treated as related, May 18, 2016, 2 pages.

* cited by examiner

| Name | ▲ Deploy Type | Properties |
|---|---|---|
| ★ JAZZ00.DEV1.LOAD | | |
| EPSCMORT | CICS PGM MODULE | |
| EPSSMLIST | | |
| RDBKP01 | | |
| ★ CICS PGM Resource | CICS PGM RESOURCE | |
| EPSCMORT | | grp=BANKA define=true |
| EPSMLIST | | grp=BANKA define=true |

FIG. 3

DEPLOYING APPLICATIONS

BACKGROUND OF THE INVENTION

The present invention relates generally to deploying applications, and more specifically, to deploying applications with deployment configurations and physical artifacts.

In the field of application deployment, one or more physical artifacts and deployment configurations are configured and installed to a system. A physical artifact may include operating system files, data sets, and libraries. Deployment configurations may include operating system configurations, middleware configurations, and the like. One challenge in application deployment is the representation of different configurations, and automation of the deployment process, as different versions of deployment configurations may not be initially compatible with versions of physical artifacts.

SUMMARY

As disclosed herein, a method, executed by a computer, for deploying an application includes receiving a deployment description that indicates the one or more deployment configurations and an artifact corresponding to a deployment, accessing a repository that contains the deployment configurations and the artifact that correspond to the deployment, enabling a user to select a subset of deployment configurations, and deploying the subset of deployment configurations and artifacts to a processing environment. A computer program product and computer system corresponding to the above method are also disclosed herein.

BRIEF DESCRIPTION OF THE DRAWINGS

FIG. 3 depicts an example of a user interface in accordance with the present invention;

DETAILED DESCRIPTION

Embodiments of the present invention relate generally to the deploying of applications, and more specifically, to deploying applications with deployment configurations and physical artifacts. Deployment configurations may not be initially compatible with some physical artifacts until configured. Furthermore, deployment configurations may not be version-controlled, or managed differently from each other. Thus, a uniform means of organizing and deploying compatibly-configured deployment configurations and physical artifacts is desirable.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of the invention as set forth hereinafter. The present invention will now be described in detail with reference to the figures.

Figure 1:
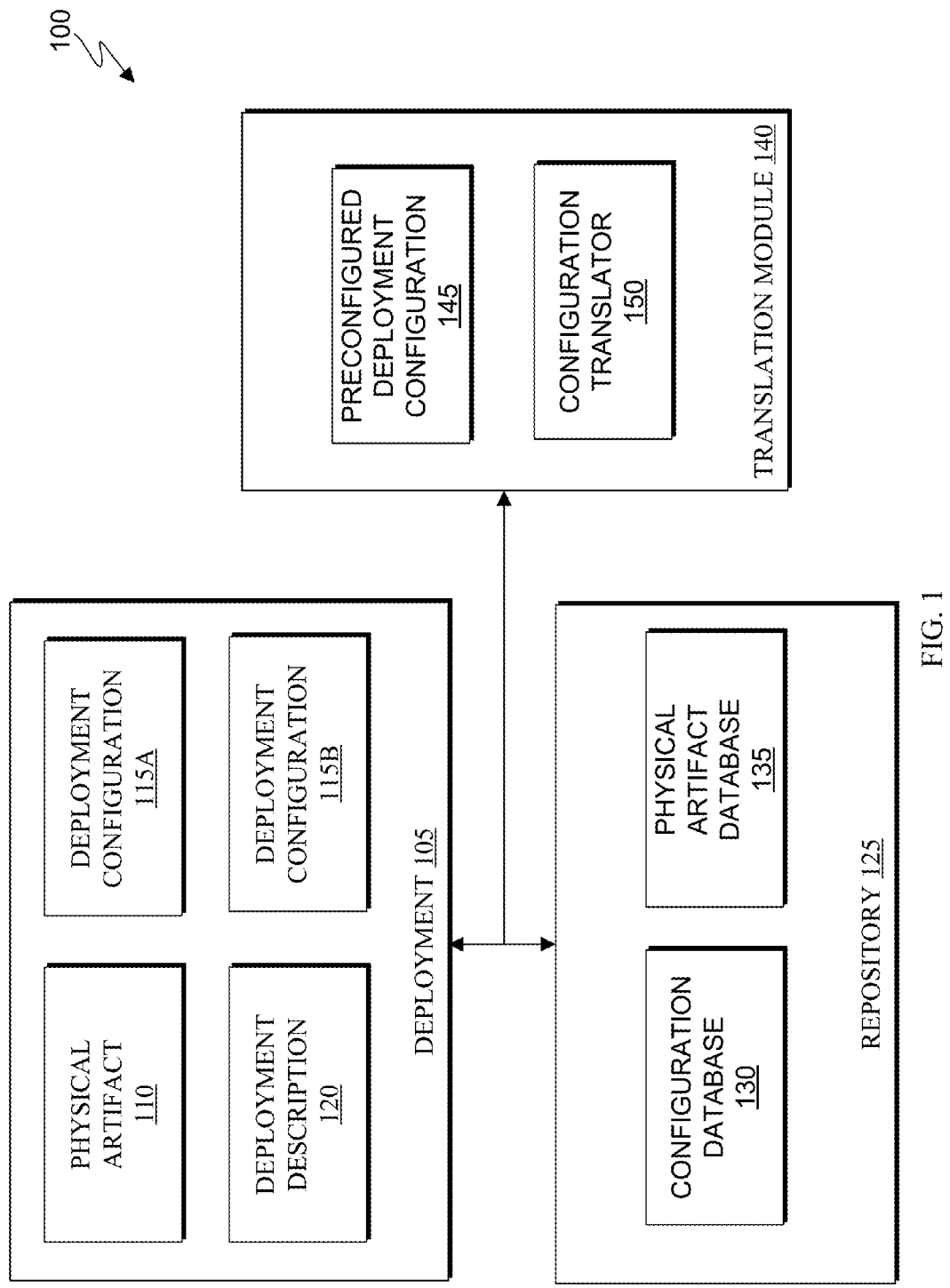
FIG. 1 is a block diagram depicting one embodiment of a deployment system in accordance with the present invention.

FIG. 1 is a block diagram depicting one embodiment of a deployment system 100 in accordance with the present invention. As depicted, the deployment system 100 includes deployment 105, physical artifact 110, deployment configurations 115A and 115B, deployment description 120, repository 125, configuration database 130, physical artifact database 135, translation module 140, preconfigured deployment configuration 145, and configuration translator 150. The deployment system 100 accesses the repository 125 for configured deployment configurations, and the translation module 140 for preconfigured deployment configurations.

In some embodiments, deployment 105 is an application that is deployed to a system and includes physical artifact 110, deployment configurations 115A and 115B, and deployment description 120. Deployment 105 may be any application, such as a Customer Information Control System (CICS) transaction resource. In some embodiments, there is more than one physical artifact 110. Physical artifact 110 may include Windows®, Unix®, or Linux files, data sets for z/OS, libraries (such as IBM i), jars, Web application archives (WARs), Application package files (APKs), and the like. As depicted, there are two deployment configurations 115A and 115B; however, in some embodiments there are more or fewer deployment configurations. Deployment configurations 115A and 115B may include operating system configurations and middleware configurations, such as WebSphere Application Server (WAS) profiles, CICS resource and message queues, and metadata in databases.

Deployment description 120 may include details that describe the deployment 105. In some embodiments, deployment description 120 is an Extensible Markup Language (XML) file. Deployment description 120 may describe which physical artifact(s) 110 and deployment configurations 115A and 115B constitute the deployment 105. Deployment description 120 may also include details such as when the physical artifact 110 and/or deployment configurations 115A and 115B were created, last modified, and/or their properties. Deployment description 120 may be user-accessible via a graphical user interface, such as is depicted in FIG. 3 (see below).

Repository 125 may include various database in which physical artifacts and deployment configurations are stored. In some embodiments, configuration database 130 stores various deployment configurations, and physical artifact database 130 stores physical artifacts. The databases may be stored in one or multiple locations, such as cloud storage, and may be local or remote with regard to the deployment 105 and/or translation module 140.

Translation module 140 may convert preconfigured deployment configuration 145 into a deployment configuration compatible with physical artifact 110 via configuration translator 150. One or more preconfigured deployment configurations 145 may be obtained from configuration database 130. Upon translating the preconfigured deployment configuration 145 into a now-compatible deployment configuration, translation module may send the deployment configuration to repository 125 for storage and/or deployment 105 for usage. Translation module may be local or remote with regard to the deployment 105 and/or repository 125.

Figure 2:
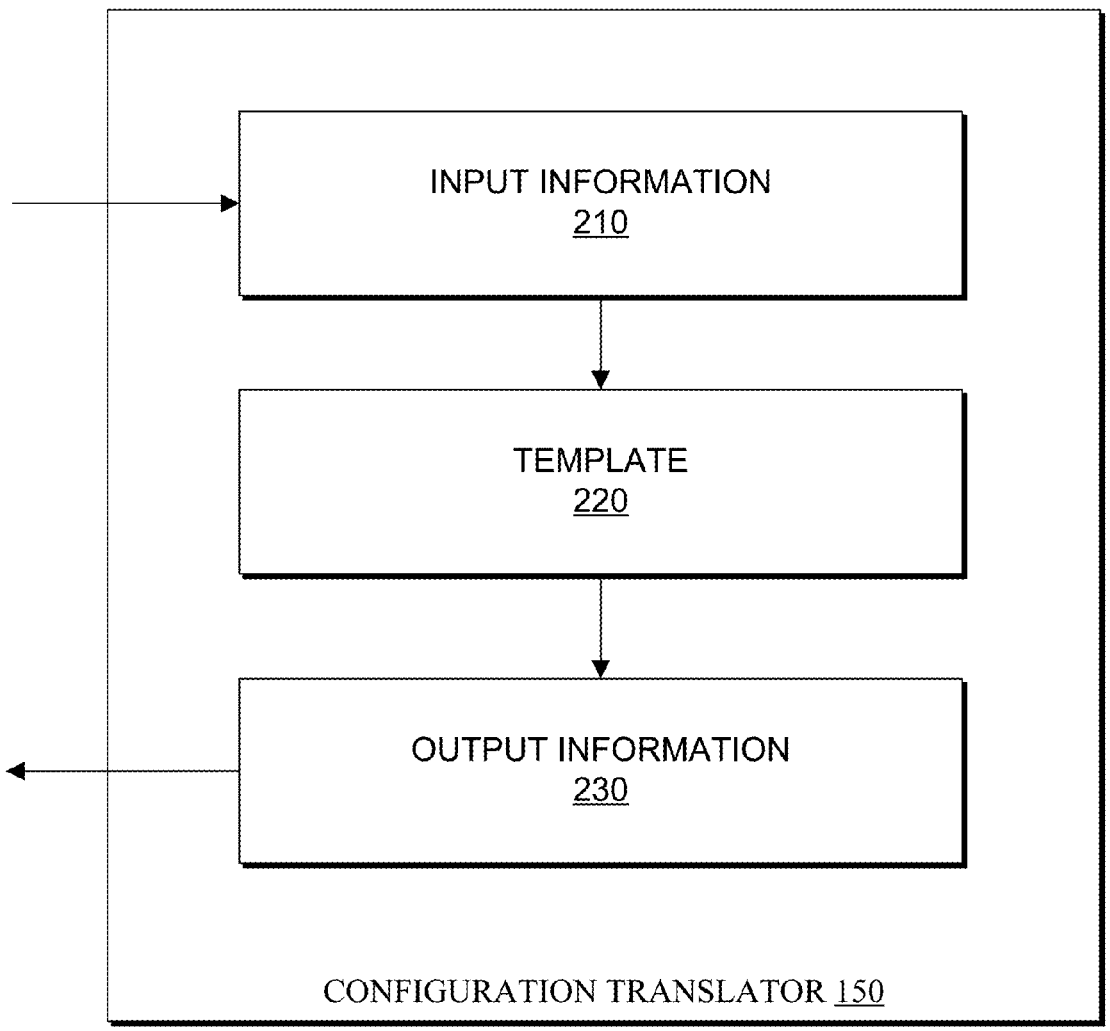
FIG. 2 is a block diagram depicting one embodiment of a configuration translator in accordance with the present invention.

FIG. 2 is a block diagram depicting one embodiment of a configuration translator 150 in accordance with the present invention. As depicted, the configuration translator 150 includes input information 210, template 220, and output information 230. The configuration translator 150 converts preconfigured deployment configurations that are incompatible with the deployment's physical artifact(s) into deployment configurations that are compatible with the physical artifact(s).

Input information 210 may be any sort of information related to a configuration, such as settings or properties. Output information 230 may be a post-translation form of input information 210 that is readable by the deployment. Configuration translator 150 converts input information 210 into output information 230 according to one or more templates. In some embodiments, templates are initially provided by a user. For example, if the input information 210 is a message queue of names in a proprietary format, the configuration translator 150 may use a template to output a list of names separated by semicolons in a file format that is compatible with the deployment 105. This is stored as output information 230 and may be sent to the deployment 105 and/or repository 125.

FIG. 3 depicts an example of a user interface 300 in accordance with the present invention. As depicted, the user interface 300 includes physical artifact indicator 310, physical artifact components 320, deployment configuration indicator 330, deployment configuration types 340, and properties 350. The user interface 300 may enable a user to read and modify deployment descriptions.

The physical artifact indicator 310 and deployment configuration indicator 330 may indicate which physical artifact(s) and deployment configurations(s) a user has selected for deployment, respectively. In the depicted example, JAZZ00.DEV1.LOAD is a physical artifact. In some embodiments, other physical artifacts and/or deployment configurations are selectable, e.g., by using a pull-down menu or inputting manually. Physical artifact components 320 may include EPSCMORT, EPSMLIST, and RDBKPO1; these may be considered to be subcomponents of a physical artifact. Deployment configuration types 340 may include deployment configurations that may be configured to function with physical artifacts, or preconfigured. Properties 350 may include the various settings of the deployment configurations and/or deployment configuration types 340, such as the group(s) to which the deployment configuration types 340 belong.

In some embodiments, user interface 300 is an Urban-Code product. There may be several different configuration types, such as a CICS Transaction resource, MQ Queue Manager, and User type. CICS Transaction Resource is a typical type of configuration that may be deployed to the CICS system (known as a DEFINE Resource in CICS terminology). A CICS Transaction Resource may have the following attributes: name, group name, description, and program.

A template like below can be used to generate the CICS command to deploy the resource.

F CICSTS52, CEDA DEFINE TRANSACTION(name) GROUP(${groupname }) DESCRIPTION (${description }) PROGRAM(${program })

This command may be executed as z/OS system command.

For a configuration type that is a MQ Queue Manager, creating a Queue Manager is a typical MQ configuration that may be performed when deploying any application that uses MQ. In some embodiments, a Queue Manager has at least the name and description attributes. A template may be used to generate the MQ commands as follows:

crtmqm-c "${description}"-11 -q ${name}

This command may be executed in the MQ command environment to perform the configuration.

In some embodiments, the configuration type is a user type. For example, when a new user is created alongside deploying an application, a user may have a name and a default password. In this example, a template that will generate the command to add a user may be:

useradd-m ${username}-p ${password}

The three examples of configuration types shows different configurations for CICS, MQ and Operating System. Some of the differences between the configuration types may include the attributes which define a configuration, the command template, and/or the target environment to run the command. In some embodiments, the command template in the second example must match the command environment in the third example in order for the command can be executed. Various command environments may be plugged into the system including those designed for a specific type of configuration.

Figure 4:
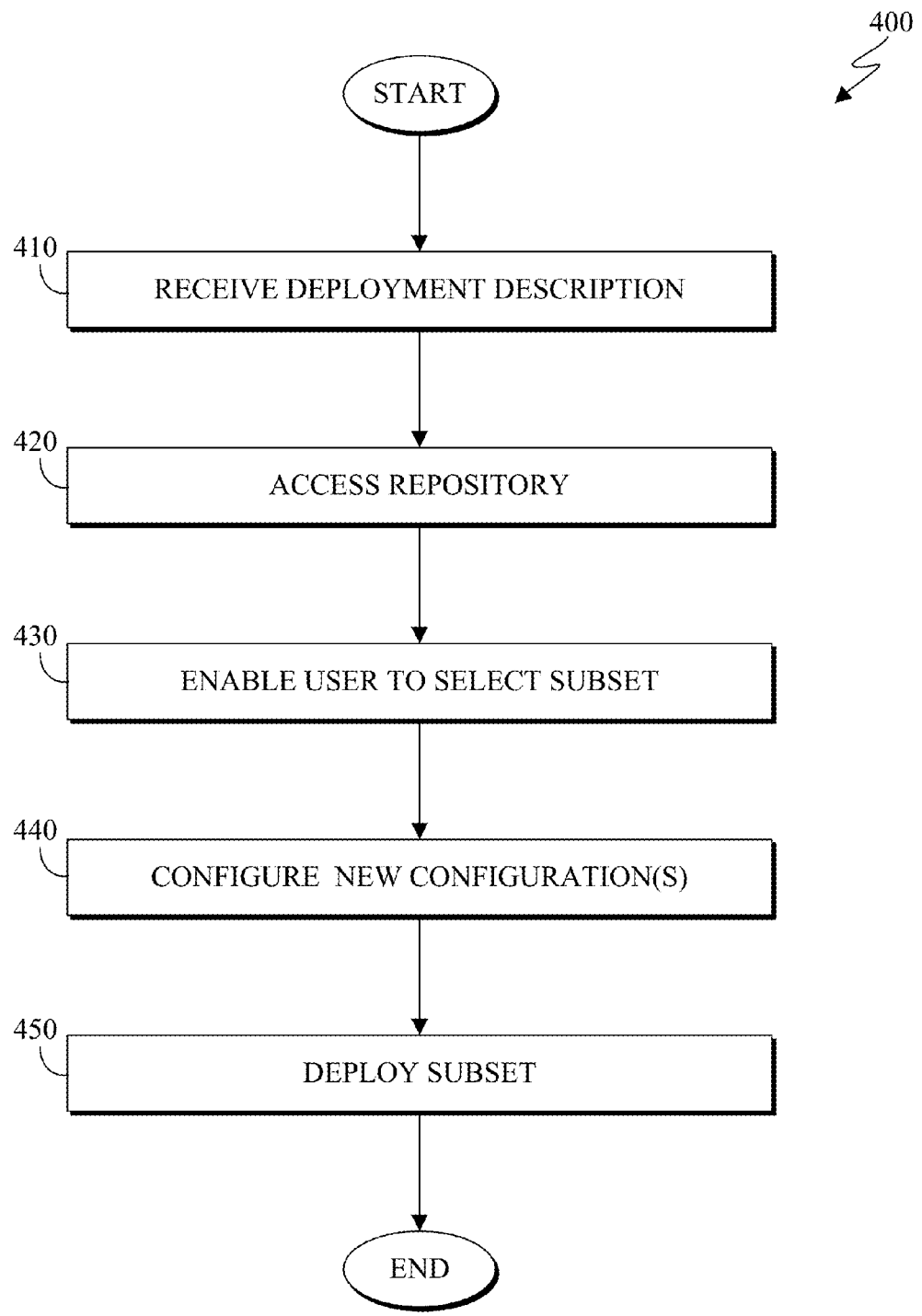
FIG. 4 is a flowchart depicting one embodiment of a deployment method in accordance with the present invention.

FIG. 4 is a flowchart depicting one embodiment of a deployment method 400 in accordance with the present invention. As depicted, the deployment method 400 includes receiving (410) a deployment description, accessing (420) a repository, enabling (430) a user to select a subset, configuring (440) new configurations, and deploying (450) the subset. The deployment method 400 may enable the streamlining of application deployment by increasing the interoperability of the various components that make up a deployment.

Receiving (410) a deployment description may include receiving information that describes the details and settings of the deployment. The deployment description may include which physical artifact(s) and deployment configuration(s) are to be used in the deployment. Accessing (420) a repository may include obtaining from one or more repositories or databases the items listed in the deployment description.

Enabling (430) a user to select a subset of deployment configurations may include presenting a list of available deployment configurations to a user and enabling the user to select which deployment configurations are to go into the deployment. Configuring (440) new deployment configurations may include enabling a user to provide a template to translate new or preconfigured deployment configurations to deployment configurations capable of functioning with the physical artifacts listed in the deployment description.

Deploying (450) the subset of deployment configurations may include deploying the subset of deployment configurations along with physical artifacts as a deployable application. The application may be deployed to a local or remote resource or a cloud platform. In some embodiments, the subset of deployment configurations and physical artifacts are grouped together as a single package for later deployment.

Figure 5:
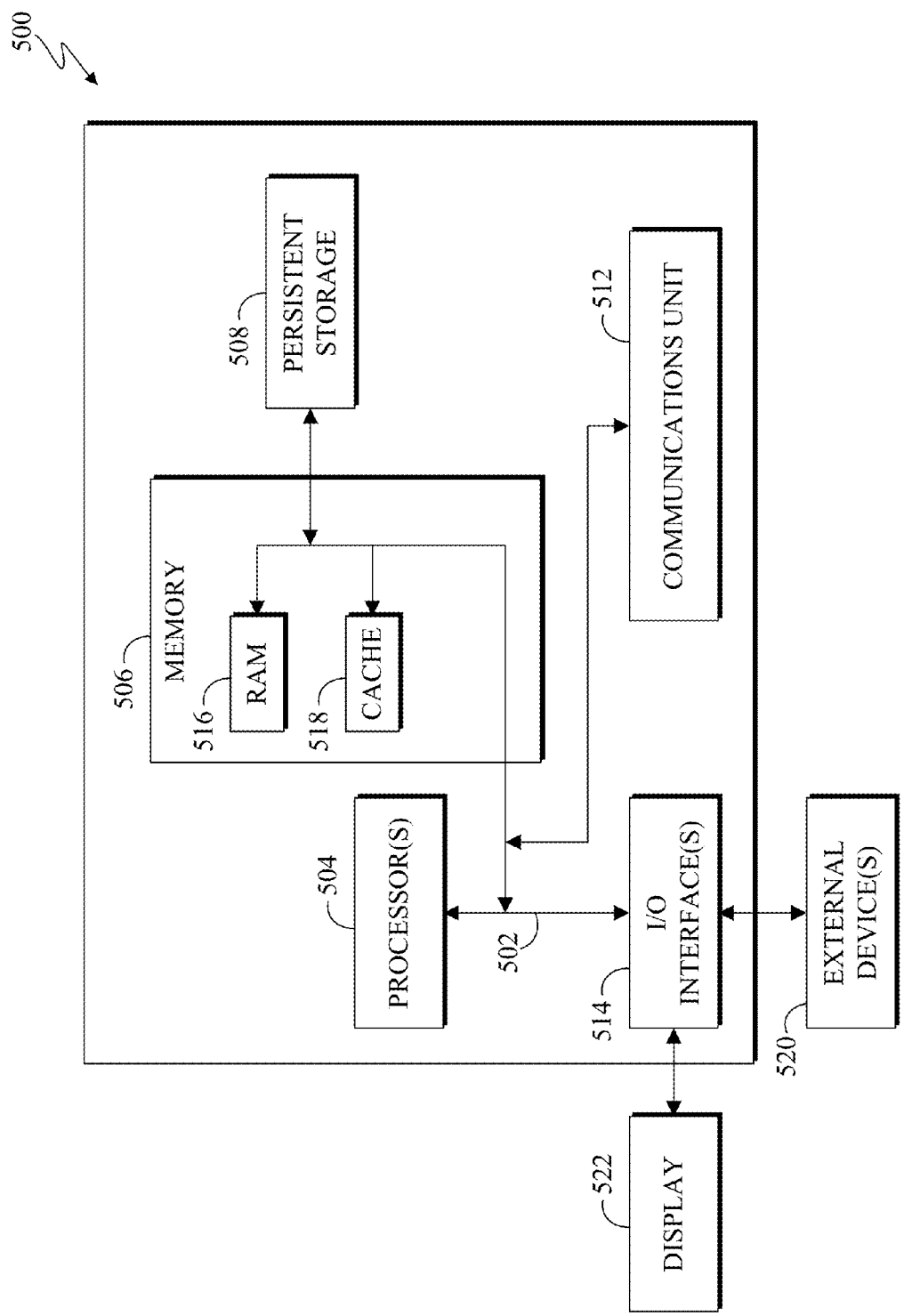
FIG. 5 is a block diagram depicting one example of a computing apparatus (i.e., computer) suitable for executing the methods disclosed herein.

FIG. 5 is a block diagram depicting components of a computer 500 suitable for executing the methods disclosed herein. It should be appreciated that FIG. 5 provides only an illustration of one embodiment and does not imply any limitations with regard to the environments in which different embodiments may be implemented. Many modifications to the depicted environment may be made.

As depicted, the computer 500 includes communications fabric 502, which provides communications between computer processor(s) 504, memory 506, persistent storage 508, communications unit 512, and input/output (I/O) interface(s) 514. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In the depicted embodiment, memory 506 includes random access memory (RAM) 516 and cache memory 518. In general, memory 506 can include any suitable volatile or non-volatile computer readable storage media.

One or more programs may be stored in persistent storage 508 for execution by one or more of the respective computer processors 504 via one or more memories of memory 506. The persistent storage 508 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 512, in these examples, provides for communications with other data processing systems or devices. In these examples, communications unit 512 includes one or more network interface cards. Communications unit 512 may provide communications through the use of either or both physical and wireless communications links.

I/O interface(s) 514 allows for input and output of data with other devices that may be connected to computer 500. For example, I/O interface 514 may provide a connection to external devices 520 such as a keyboard, keypad, a touch screen, and/or some other suitable input device. External devices 520 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 508 via I/O interface(s) 514. I/O interface(s) 514 may also connect to a display 522. Display 522 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer system for deploying an application, the computer system comprising:
   one or more computer processors;
   one or more computer readable storage media;
   program instructions stored therein for execution by at least one of the one or more computer processors, the program instructions comprising instructions to:
   provide a template for translating a preconfigured deployment configuration;
   receive a deployment description that indicates one or more deployment configurations and an artifact corresponding to a deployment, wherein at least one of the one or more deployment configurations is the preconfigured deployment configuration;
   translate the preconfigured deployment configuration according to the template to produce a compatible deployment configuration, wherein translating the preconfigured deployment configuration further comprises translating, according to the template, input information corresponding to the preconfigured deployment configuration into output information in a format that is compatible with the artifact and a subset of deployment configurations;
   enable a user to select the subset of deployment configurations; and
   deploy the subset of deployment configurations, the compatible deployment configuration, and the artifact to a processing environment.

2. The computer system of claim 1, further comprising instructions to enable a user to customize a command template.

3. The computer system of claim 1, wherein instructions to deploy the subset of deployment configurations and the artifact to a processing environment comprise instructions to:
   generate commands to deploy each deployment configuration of the subset of deployment configurations; and
   execute the commands.

4. The computer system of claim 1, wherein the template is provided by a user.

5. The computer system of claim 1, wherein a deployment configuration comprises a middleware application configuration.

6. The computer system of claim 1, wherein the deployment description is an Extensible Markup Language file.

7. A computer program product for deploying an application, the computer program product comprising:
   a computer readable storage medium and program instructions stored on the computer readable storage medium, the program instructions comprising instructions to:
   provide a template for translating a preconfigured deployment configuration;
   receive a deployment description that indicates one or more deployment configurations and an artifact corresponding to a deployment, wherein at least one of the one or more deployment configurations is the preconfigured deployment configuration;
   translate the preconfigured deployment configuration according to the template to produce a compatible deployment configuration, wherein translating the preconfigured deployment configuration further comprises translating, according to the template, input information corresponding to the preconfigured deployment configuration into output information in a format that is compatible with the artifact and a subset of deployment configurations;

enable a user to select the subset of deployment configurations; and deploy the subset of deployment configurations, the compatible deployment configuration, and the artifact to a processing environment.

8. The computer program product of claim 7, further comprising instructions to enable a user to customize a command template.

9. The computer program product of claim 7, wherein instructions to deploy the subset of deployment configurations and the artifact to a processing environment comprise instructions to:

generate commands to deploy each deployment configuration of the subset of deployment configurations; and execute the commands.

10. The computer program product of claim 7, wherein a deployment configuration comprises a middleware application configuration.

11. The computer program product of claim 7, wherein the deployment description is an Extensible Markup Language file.

12. The computer system of claim 7, wherein the template is provided by a user.

\* \* \* \* \*